US005996890A

United States Patent [19]

Lee

[11] Patent Number: 5,996,890

[45] Date of Patent: Dec. 7, 1999

[54] POSTAGE METERING APPARATUS

[75] Inventor: Daniel John Lee, Brentwood, United Kingdom

[73] Assignee: Neopost Limited, Essex, United Kingdom

[21] Appl. No.: 09/013,536

[22] Filed: Jan. 26, 1998

[30] Foreign Application Priority Data

Jan. 29, 1997 [GB] United Kingdom .................. 9701814

[51] Int. Cl.[6] ........................................ G06F 7/08

[52] U.S. Cl. ........................ 235/381; 705/400; 705/401

[58] Field of Search .............................. 235/379, 380, 235/382, 381; 705/400, 401, 402, 403, 404, 405, 406, 407, 408, 409, 410

[56] References Cited

U.S. PATENT DOCUMENTS

| | | | |
|---|---|---|---|
| 4,218,011 | 8/1980 | Simjian | 235/432 |
| 4,258,252 | 3/1981 | Simjian | 235/379 |
| 4,317,028 | 2/1982 | Simjian | 235/380 |
| 4,436,992 | 3/1984 | Simjian | 235/380 |
| 4,787,045 | 11/1988 | Storace | 705/403 |
| 4,811,234 | 3/1989 | Storace | 705/403 |
| 4,831,554 | 5/1989 | Storace | 705/403 |
| 4,864,506 | 9/1989 | Storace | 235/381 |
| 5,513,112 | 4/1996 | Herring et al. | 705/404 |

FOREIGN PATENT DOCUMENTS

| | | |
|---|---|---|
| 01725732A2 | 2/1986 | European Pat. Off. . |
| 0172574A2 | 2/1986 | European Pat. Off. . |
| 0194658A2 | 9/1986 | European Pat. Off. . |
| 2184692A | 7/1987 | United Kingdom . |
| 2185939A | 8/1987 | United Kingdom . |
| 2208367A | 3/1989 | United Kingdom . |
| 2232379A | 12/1990 | United Kingdom . |

*Primary Examiner*—Thien M. Le

*Attorney, Agent, or Firm*—Shoemaker and Mattare, Ltd.

[57] ABSTRACT

A postage meter provided with a credit register is also provided with a debit register. When credit value in the credit register is insufficient for a postage charge to be applied to a mail item in a franking operation, the debit register is incremented by an amount equal to the excess of the postage charge amount over the credit value. Accordingly the postage meter is enabled to be operated even when there is insufficient credit.

8 Claims, 3 Drawing Sheets

POSTAGE METERING APPARATUS

BACKGROUND OF THE INVENTION

This invention relates to postage metering apparatus for metering of value for use in postage or other charges for handling of items such as mail items.

Postage meters are known which operate in a so-called pre-payment mode. In the pre-payment mode of operation, a user the meter makes a payment to the postal authority and the postal authority then authorises the entry of a credit value into the meter which is then available for use in carrying out postage metering operations. During each postage metering operation, the credit value is checked to ensure that it is sufficient to meet the cost of a postage charge to be applied to a mail item and the credit value is incremented by the amount of the postage charge applied. If the credit value is less than the postage charge to be applied, the meter is inhibited from completing the postage metering operation. When the credit value remaining in the meter is zero, or is less than any required postage charge, the meter is inhibited from effecting any further postage metering until such time as an additional increment of credit is entered into the meter and added to the credit value in the meter. In another manner of operation of a postage meter in pre-payment mode described and claimed in our co-pending GB application 9609614.4 the credit value is incremented by each entry of new credit into the postage meter but is not decremented by the amount of the postage charge applied. In each postage metering operation the accumulated credit value in the meter is compared with an accumulated total amount of postage charges applied to mail items by the meter. If the credit value exceeds the total amount of postage charges by at least the amount of postage charge to be applied, the meter is permitted to complete the postage metering operation and the accumulated total amount of postage charges is incremented by the amount of the postage charge applied. Otherwise the meter is inhibited from completing the postage metering operation. Continued operation of the meter is permitted when further credit value is entered into the meter and the accumulated credit value in the meter is incremented by the further credit value so as to exceed the accumulated total amount of postage applied.

It is usual in postage meters operating in pre-payment mode to provide a warning to the user of the meter when the value in the meter is such that only a small limited amount of further postage metering is possible. However a user may overlook the warning and the meter will become inhibited. If a large batch of mail is being processed the warning may occur during processing of the batch of mail and the credit value in the meter may be such that the meter is unable to complete the processing of the batch of mail.

In order to enter further credit value into the meter it may be necessary to take the meter to a postal authority office and hence processing of mail may be disrupted by unexpected inhibition of the meter. As an alternative to taking the meter to a postal authority office the meter may be provided with a facility to permit further credit value to be entered into the meter by remote resetting of the credit value in the meter under the control of a remote resetting centre. The provision of remote resetting of the credit value in the meter aids in avoiding or reducing the disruption provided communication can be established with the remote resetting centre. However, if there is a failure in communication with the resetting centre, processing of the mail would be inhibited or disrupted.

SUMMARIES OF THE INVENTION

According to one aspect of the invention a postage meter includ electronic accounting means; input means for input to the electronic accounting means of a required postage charge; non-volatile memory means for storing critical accounting data; said non-volatile memory means including a credit register for storing a value of credit; and said electronic accounting means being operative in a franking operation to determine if a value of credit stored in said credit register is insufficient for the required postage charge and in response to determining that the value of credit is insufficient for the postage charge to store a value of debit in said non-volatile memory means in accordance with the value of credit and the required postage charge.

According to a second aspect of the invention a postage meter includes electronic accounting means; input means for input to the electronic accounting means of a required postage charge; non-volatile memory means for storing critical accounting data; said non-volatile memory means including a credit register and a debit register; said credit register storing a value of credit; and said electronic accounting means being operative in a franking operation to determine if the value of credit is insufficient for the required postage charge and to increment the debit register by a debit increment in accordance with the value of credit and the required postage charge.

BRIEF DESCRIPTION OF THE DRAWING

An embodiment of the invention will be described hereinafter by way of example with reference to the drawings in which.

DESCRIPTION OF THE PREFERRED EMBODIMENT

Figure 1:
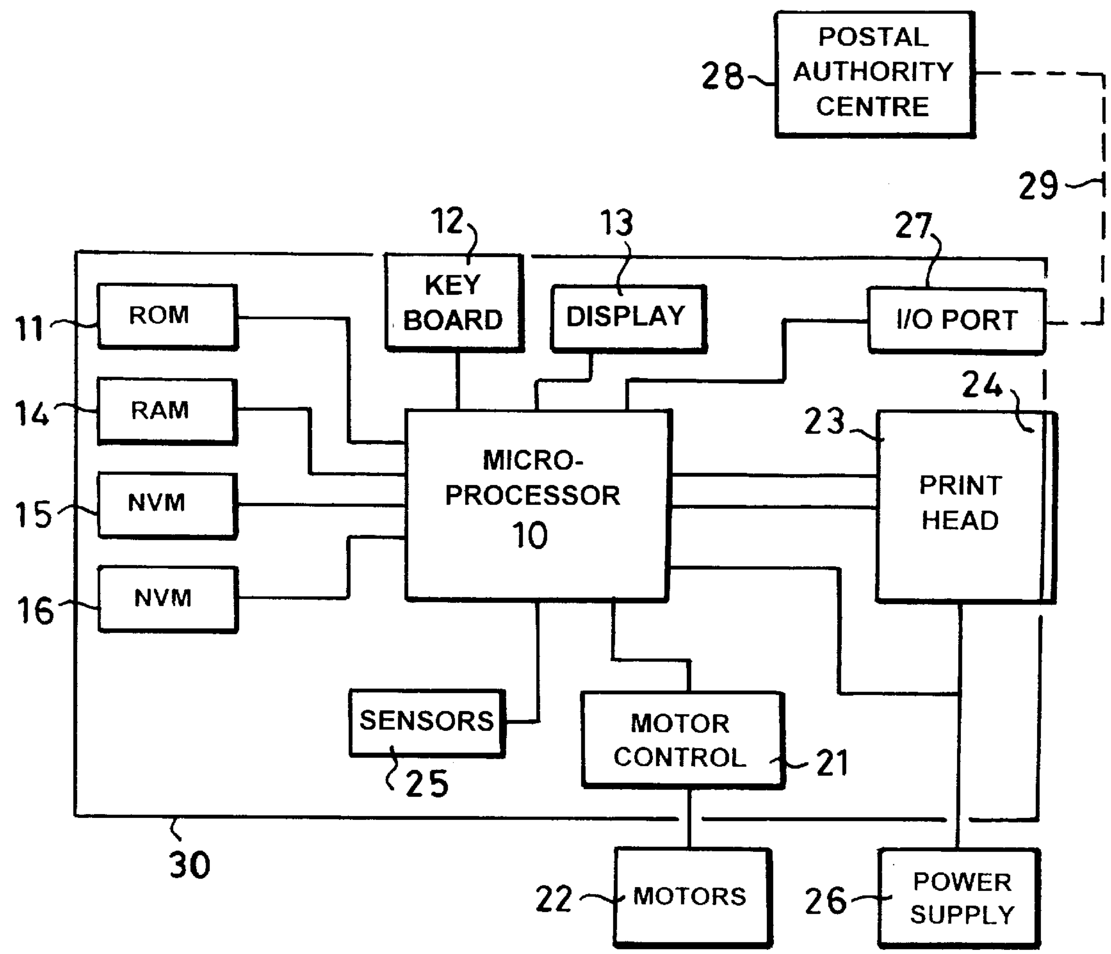
FIG. 1 is a block circuit diagram of a postage meter.
Figure 2:
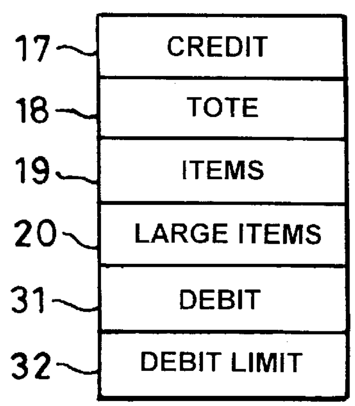
FIG. 2 illustrates accounting registers in non-volatile memory.

Referring to FIG. 1 of the drawings, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with postage charges applicable to handling of the mail items by the postal authority or another carrier. Accounting data relating to use of the postage meter for printing franking impressions representing postage charges for mail items and any other critical data to be retained is stored in the non-volatile memories 15, 16. The accounting data includes a credit value, an accumulated total amount (tote value) used by the meter in franking mail items, a count of the number of mail items franked by the meter and a count of the number of mail items franked with a postage charge in excess of a predetermined value. As shown in FIG. 2 the accounting data is stored in a set of registers in the non-volatile memories. The credit value is stored in a register 17, the accumulated total amount is stored in an ascending tote register 18, the count of items is stored in an items register 19 and the count of items franked with a postage charge in excess of a predetermined value is stored in a large items register 20. As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

A motor controller 17 is controlled by the microprocessor 10 to control operation of motors 22 driving feeding means (not shown) for feeding a mail item past a digital print head 23. The digital print head 23 is preferably a thermal print head including selectively energisable thermal printing elements 24. Sensors 25 are provided to sense and monitor feeding of the mail item. The sensors provide signals to the microprocessor to enable the microprocessor to control feeding of the mail item and to control selective energisation of the thermal print elements 24 of the print head from a power supply 26 at appropriate times as the mail item is fed past the print head to print a required postage indicium, and optionally a slogan, on the mail item.

It is to be understood that although the postage meter is described hereinbefore as including a thermal printer for printing postage indicia on mail items, the postage meter may include other types of printing device such as, for example, a print drum with selectively settable print wheels or digital printing devices including impact dot matrix, ink jet and laser.

An input/output port 27 is provided to enable communication between the postage meter and external apparatus. The input/output port 27 may be utilised for communication between the postage meter and a postal authority centre 28 via a communication link 29 such as a telephone network for the purpose of resetting the credit value in the meter. In addition the input/output port may be utilised for communication between the postage meter and other external devices, for example weighscales, for the input of postage or other data to the postage meter and for the output of data from the postage meter.

It will be appreciated that, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorised tampering are housed in a secure housing 30.

In one manner of so-called prepayment operation of the postage meter, the descending register 17 of the meter is set with a credit value which is then available for use in franking mail items. Each time a franking operation is to be performed, the micro-processor carries out a routine in which a determination is made as to whether the credit value in the descending register is sufficient to cover the cost of the postage charge intended to be applied in respect of the mail item. If the credit value in the descending register is sufficient the franking operation is continued. The credit value in the descending register is decremented by the amount of the postage charge, the contents of the other registers are updated to account for the postage charge and the postage indicium is printed on the mail item. However if the value of credit in the descending register is less than the postage charge intended to be applied to the mail item, the routine is terminated and the franking impression is not printed.

Generally, if the microprocessor determines that the value of credit in the descending register is less than a predetermined value, the microprocessor terminates the current franking operation and locks the postage meter from further use in franking mail items until such time as the value of credit in the descending register has been reset to a higher value.

In another manner of operation in pre-payment mode, described in our pending GB patent application 9609614.4, the credit value is stored in an ascending credit register and is not decremented in each franking operation. Instead of determining if the credit value is sufficient to cover the cost of a postage charge to be applied, a determination is made as to whether the credit value exceeds the accumulated amount of postage (tote value) by at least the amount of the postage charge to be applied. If credit value is greater than the sum of the tote value and the postage amount to be applied, the franking operation is then continued but, if the credit value is less than the sum of the tote value and the postage amount to be applied, the franking operation is terminated and the postage indicia is not printed.

It will be appreciated that it could be extremely inconvenient for a user of the postage meter if the postage meter is locked unexpectedly without warning. Accordingly it is customary for the microprocessor 10 to operate the display 13 to display a warning message, such as "Warning Low Credit Level", to a user when the amount of credit value in the credit register 17 is such that only a limited relatively small value of further franking will be permitted by the postage meter. Therefore the user is warned to take action to rest the credit register with additional credit before the credit value in the register 17 of the meter is such that the meter locks from further use in franking mail items and thereby may avoid disruption of processing of mail.

Resetting of the descending register with a new updated value of credit and reading of the registers may be effected by the user taking the postage meter to a postal authority resetting office or may be effected remotely by use of communication via the input/output port 27 and the telephone communication link 29 with a remote resetting centre at a postal authority centre 28.

Despite the provision of a warning message to the user, the user inadvertently may fail to react to the message or, when attempting to reset the credit register of the meter, the user may encounter difficulty in establishing communication with the remote resetting centre. For example there may be a breakdown in the telecommunications link to the resetting centre or there may be a fault in the equipment at the resetting centre. As a consequence the user may be faced with a disruption in their ability to use the postage meter to process mail items due to the credit value in the meter being at an insufficient low level.

To overcome the inconvenience resulting from lock out of the postage meter, the postage meter of the present invention is enabled to operate in a debit mode of operation in the event of the credit in the credit register being insufficient to enable franking operations to be effected. When operating in the debit mode of operation, in the event of the credit in the credit register being insufficient to enable a franking operation to be effected, a value of debit resulting from effecting the franking operation is entered into the non-volatile memories. The debit value may be written to a debit register 31 provided in the non-volatile memories and, in the same manner as the other registers, the debit register 31 is replicated in the memory devices 15, 16. A debit limit register 32 is also provided and is set with a value which is the maximum permitted value of debit. The value in the debit limit register may be set at the time of manufacture of the postage meter to a standard value or may be settable by the postal authority to a variable value determined according to a determined credit worthiness of the user of the postage meter. Where the debit limit value is a variable value, the value set in the debit register may be set or rest by a secure communication with the postal authority centre. The facility for debit may be initiated during manufacture of the postage meter or may be initiated at a later time, for example when the postage meter is installed at a user location and when the user desires to have the debit facility. It will be appreciated that initiation of the debit facility and setting or resetting the debit value can be effected only in a procedure authorised by the postal authority and can not be carried out by a user of the postage meter. Initiation of the debit facility or resetting of the debit limit may be effected remotely by communication with the postal authority centre. In such communication, the postal authority centre sends an authorisation signal containing a code unique to the postage meter to which the postage meter is able to respond and initiate the debit facility or rest the debit limit.

Figure 3:
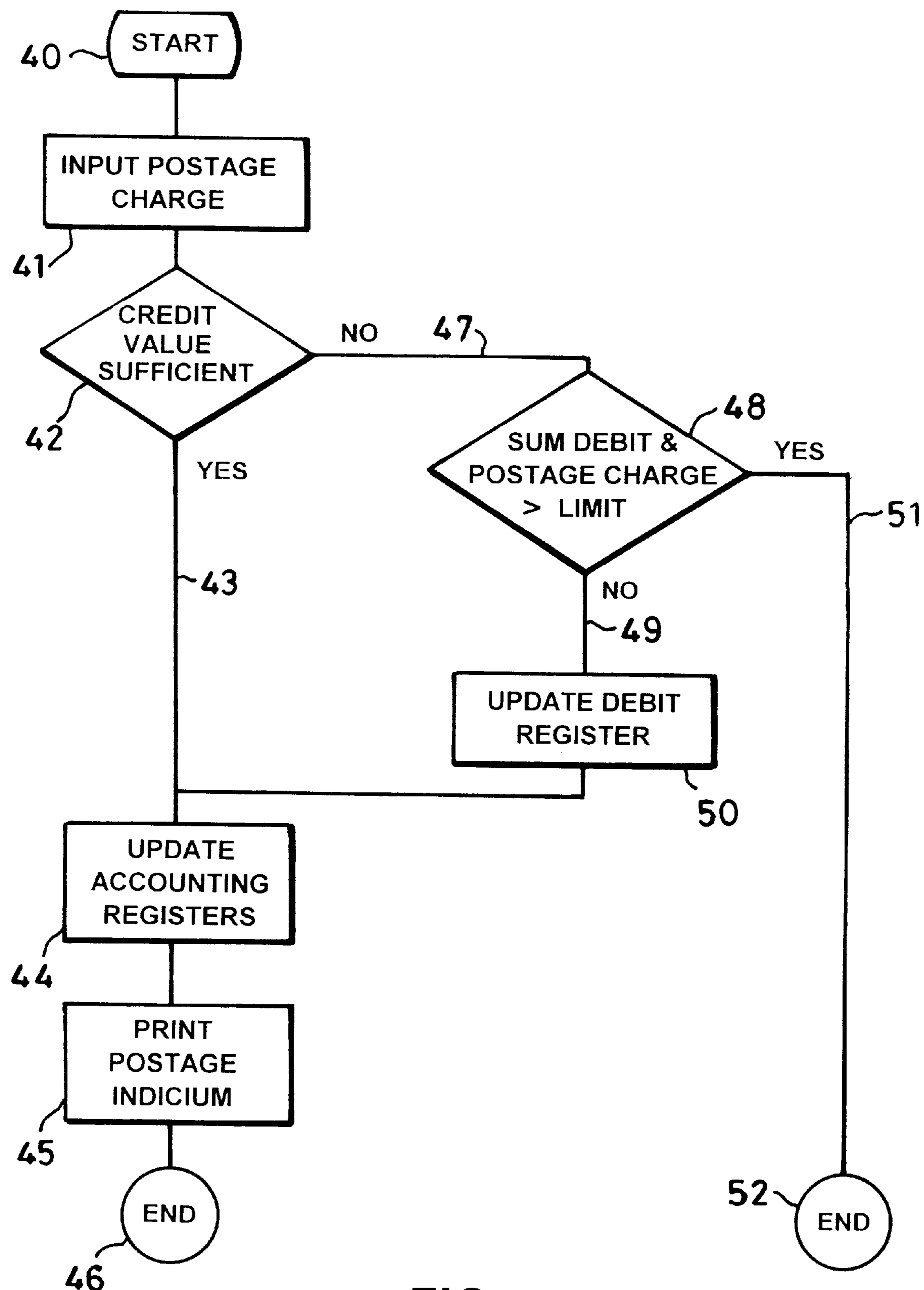
FIG. 3 is a flow chart illustrating a franking operation program routine.

Referring now to FIG. 3 the operation of the postage meter in a franking operation is illustrated by a flow chart. The franking operation program routine is initiated at "START" (box 40) and a postage charge amount is input (box 41), A determination (box 42) is made as to whether the credit in the credit register 17 is sufficient in respect of the required postage charge amount. If the credit is sufficient (YES exit 43), the accounting registers 18, 19 and 20 are updated (box 44), the postage indicium is printed (box 45) and the franking operation ends (END box 46). It will be appreciated that if the postage meter is operating in a manner in which credit register is decremented in each franking operation, the updating of accounting registers (box 44) also includes decrementing the credit register 17. If the credit is not sufficient (NO exit 47 of box 42) the program routine branches to a determination (box 48) of whether the sum of the debit content of register 31 and the required postage charge amount is greater than the debit limit set in register 32. If the sum of the debit content of register 31 and the required postage charge amount is not greater than the debit limit set in register 32 (NO exit 49 of box 48) the program routine proceeds to update the debit register (box 50), by incrementing the contents of the debit register to reflect expenditure in respect of the required postage charge, and then returns to the main routine of updating the accounting registers (box (44) and printing the postage indicium (box 45). However if the sum of the debit content of register 31 and the required postage charge amount is greater than the debit limit set in register 32 (YES exit 51 of box 48) completion of the franking operation would result in exceeding the debit limit set in register 32 and therefore the franking routine ends (box 52).

Figure 4:
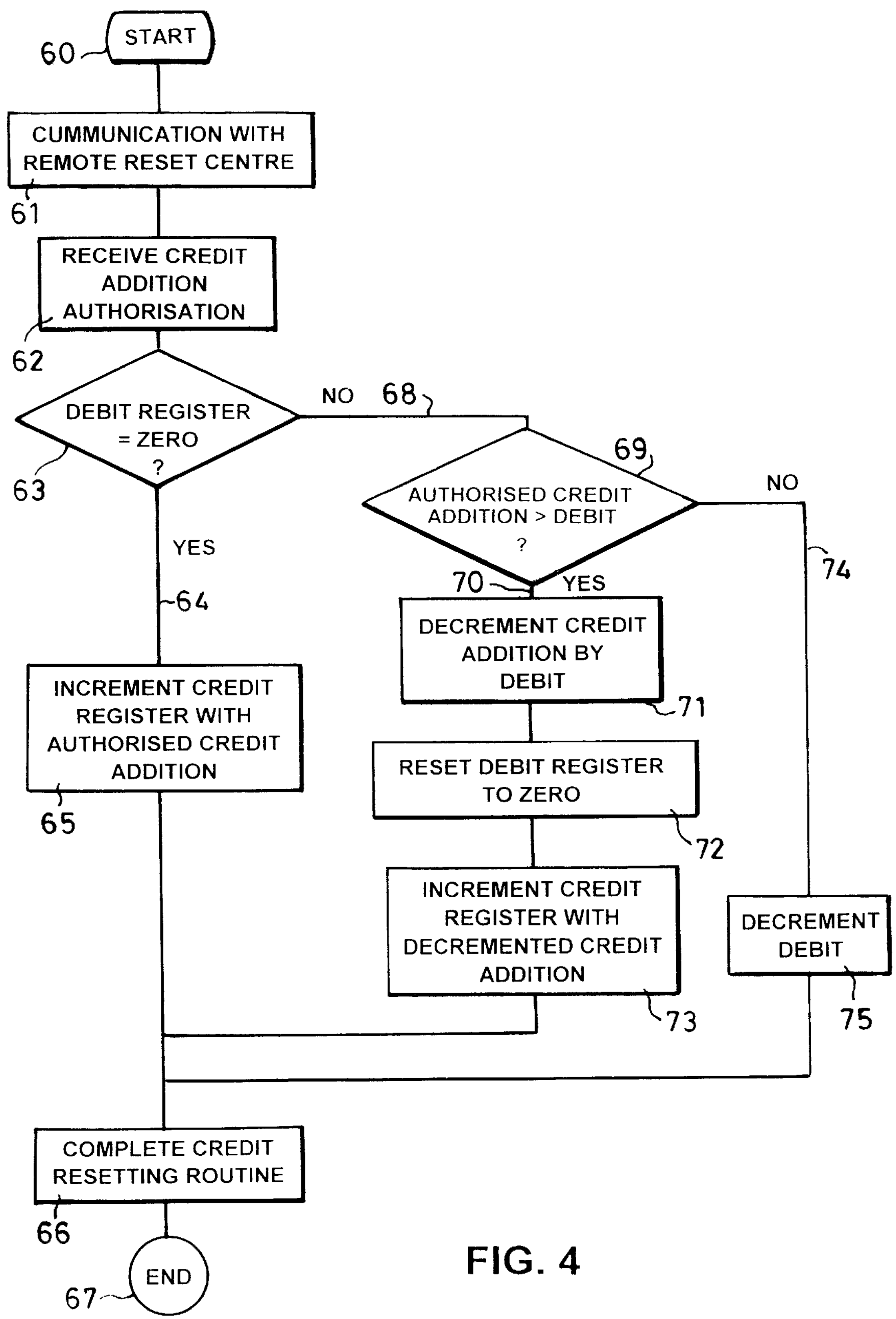
FIG. 4 is a flow chart illustrating a program routine of the postage meter for resetting the credit in the postage meter.

Referring now to FIG. 4 a credit resetting routine for the postage meter is illustrated by a flow chart. the resetting routine is started (box 60) and following successful communication (box 61) with the remote resetting centre 28 the postage meter receives (box 62) an authorisation message from the remote resetting centre whereby the postage meter is enabled to increment the credit in the credit register by an authorised credit addition. A method of remotely resetting the credit register in a postage meter is disclosed in our U.S. Pat. No. 5,077,792 to which reference may be made and therefore it is considered to be unnecessary to provide detailed description of the method of remote resetting herein.

After receipt of the authorisation message for the credit value to be incremented the program routine determines (box 63) whether the content of debit register 31 is zero. If the debit register content is zero (YES exit 64 of box 63) the program routine increments (box 65) the credit value in credit register 17 by an amount equal to the credit addition authorised by the authorisation message and the program routine then completes (box 66) the resetting routine and ends (box 67). The completion of the resetting routine may include further communication with the remote resetting centre in which updated current settings of the registers are transmitted to the resetting centre as is described in our U.S. Pat. No. 5,077,792.

If the debit register 31 content in not zero (NO exit 68 of box 63) the program routine branches and determines (box 69) if the authorised increment of credit is greater than the debit in register 31. If the authorised credit addition is greater than the debit in register 31 (YES exit 70 of box 69) the authorised credit addition is decremented (box 71) by the value in the debit register 31 and the debit register 31 is reset to zero (box 72). The credit register 17 is incremented (box 73) by an amount equal to the decremented value of the authorised credit addition. The program routine then returns to the main routine to complete the remote resetting routine (box 66) and ends (box 67). If the authorised credit addition is not greater than the debit in register 31 (NO exit 74 of box 69) the value in debit register is decremented by an amount equal to the authorised credit addition (box 75) and the program routine returns to the main routine at box 66 to complete the routine and end (box 67). It will be appreciated that the resetting routine operates firstly to use the authorised credit addition to reduce the debit in register 31 to zero if the authorised credit addition is sufficient and then to increment the credit register by any balance of the authorised credit addition.

The invention may be utilised in postage meters constructed as hereinbefore described and intended solely for the purpose of metering postage value used and printing postage indicia on mail items. However the invention is not restricted to postage meters. The invention may be utilised also in postage metering apparatus constructed to meter postage value and to be utilised in conjunction with a user computer, for example a personal computer and printer, for input and display of information and wherein the printer is controlled by the user computer to print postage indicia on mail items. accordingly the term postage meter is to be understood as encompassing postage metering apparatus for use in conjunction with a user computer and the combination of postage metering apparatus with a user computer and printer. The terms mail item and postage are to be understood as including not only items handled by postal authorities and for which postage charges are made but also items, for example parcels and other packages, handled by other carriers and for which carriage charges are made.

We claim:

1. A postage meter including electronic accounting means; input means for input to the electronic accounting means of a required postage charge; non-volatile memory means for storing critical accounting data; said non-volatile memory means including a credit register for storing a value of credit; and said electronic accounting means being operative in a franking operation to determine if a value of credit stored in said credit register is insufficient for the required postage charge and in response to determining that the value of credit is insufficient for the postage charge to store a value of debit in said non-volatile memory means in accordance with the value of credit and the required postage charge.

2. A postage meter including electronic accounting means; input means for input to the electronic accounting means of a required postage charge; non-volatile memory means for storing critical accounting data; said non-volatile memory means including a credit register and a debit register; said credit register storing a value of credit; said electronic accounting means being operative in a franking operation to determine if the value of credit is insufficient for the required postage charge and to increment the debit register by a debit increment in accordance with the value of credit and the required postage charge.

3. A postage meter as claimed in claim 2 wherein the electronic accounting means is operative in a franking operation to increment the debit register by a debit increment equal to an amount by which the required postage value exceeds the credit value.

4. A postage meter as claimed in claim 1 including a stored value of debit limit and wherein the electronic accounting means is operative in a franking operation to inhibit the franking operation if the sum of the required postage value and the debit value exceeds the stored value of debit limit.

5. A postage meter as claimed in claim 4 wherein the stored value of debit limit is a fixed value.

6. A postage meter as claimed in claim 4 wherein the stored value of debit limit is a variable value.

7. A postage meter as claimed in claim 6 wherein the stored value of debit limit can be reset in a secure communication procedure with a postal authority centre.

8. A postage meter as claimed in claim 2 wherein, in a recredit operation in which the electronic accounting means is enabled to enter an increment of credit value into the postage meter, the electronic accounting means firstly decrements the debit value in the debit register and secondly when the debit value in the debit register is decremented to zero increments the credit value in the credit register by an amount equal to any excess of the increment of credit value over the debit value.

* * * * *